US009754691B2

(12) United States Patent
Dufour et al.

(10) Patent No.: US 9,754,691 B2
(45) **Date of Patent: *Sep. 5, 2017**

(54) FLUIDTIGHT CHAMBER COMPRISING AN OPENING AND CLOSING CONTROL MECHANISM FOR A DEVICE PROVIDING FLUIDTIGHT CONNECTION BETWEEN TWO ENCLOSED VOLUMES

(71) Applicant: Getinge la Calhene, Vendome (FR)

(72) Inventors: Christophe Dufour, Saint Amand Longpre (FR); Julien Felix, Tours (FR)

(73) Assignee: GETINGE LA CALHENE, Vendome (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/914,219

(22) PCT Filed: Sep. 1, 2014

(86) PCT No.: PCT/EP2014/068477

§ 371 (c)(1),
(2) Date: Feb. 24, 2016

(87) PCT Pub. No.: WO2015/032712

PCT Pub. Date: Mar. 12, 2015

(65) Prior Publication Data

US 2016/0281418 A1 Sep. 29, 2016

(30) Foreign Application Priority Data

Sep. 3, 2013 (FR) ..................................... 13 58409

(51) Int. Cl.
*G21F 7/005* (2006.01)
*E05F 15/611* (2015.01)
(Continued)

(52) U.S. Cl.
CPC .............. *G21F 7/005* (2013.01); *B25J 21/02* (2013.01); *E05F 15/611* (2015.01); *E06B 7/20* (2013.01)

(58) Field of Classification Search
CPC ...... B01L 1/02; B01L 2300/041; G21F 7/005; G21F 5/12; G21F 7/047; G21F 5/00
See application file for complete search history.

(56) References Cited

U.S. PATENT DOCUMENTS 3,682,208 A * 8/1972 Fedi ........................ G21F 7/005 141/384
4,260,312 A * 4/1981 Hackney ................ G21F 7/005 250/506.1
(Continued)

FOREIGN PATENT DOCUMENTS

CN 201212557 Y 3/2009
CN 101865291 A 10/2010
(Continued)

OTHER PUBLICATIONS

Search Report issued in French Patent Application No. FR 13 58409 dated Jun. 23, 2014.
(Continued)

*Primary Examiner* — Justin Rephann
(74) *Attorney, Agent, or Firm* — Pearne & Gordon, LLP

(57) ABSTRACT

Device for the sealed connection between a first and a second closed space, with the first closed space comprising openings closed off by a door, comprising: first part (A) for securing two closed spaces, second part (B) for securing two doors and of unlocking one of the door, third part (C) for releasing the other door, fourth part (D) for opening a passage between the two closed spaces, a control ring (48) able to be put into rotation around a longitudinal axis (X), with the rotation of the control ring (48) actuating at least the
(Continued)

second (B), third (C) and fourth (D), parts, and a device for actuating the control ring and first means.

28 Claims, 12 Drawing Sheets

(51) Int. Cl.
*B25J 21/02* (2006.01)
*E06B 7/20* (2006.01)

(56) References Cited

U.S. PATENT DOCUMENTS

| | | | | | |
|---|---|---|---|---|---|
| 4,643,328 | A * | 2/1987 | Lorenzelli | G21F 7/005 220/256.1 |
| 5,139,318 | A * | 8/1992 | Broxup | G21F 7/047 312/1 |
| 5,421,626 | A | 6/1995 | Glachet | |
| 5,853,207 | A * | 12/1998 | Saint Martin | B01L 1/02 292/256.6 |
| 6,553,722 | B1 * | 4/2003 | Porret | B01L 1/02 49/507 |
| 6,591,662 | B1 * | 7/2003 | Grimard | B01L 1/02 73/46 |
| 8,714,559 | B2 | 5/2014 | Hoeting | |
| 8,919,830 | B2 * | 12/2014 | Norton | B01L 1/02 292/143 |
| 8,950,624 | B2 * | 2/2015 | Sacca | G21F 7/005 141/98 |
| 9,283,556 | B2 * | 3/2016 | Armau | B01L 1/02 |
| 9,440,229 | B2 * | 9/2016 | Nodin | B01L 1/02 |
| 9,446,401 | B2 * | 9/2016 | Nodin | B01L 1/02 |
| 2003/0155846 | A1 * | 8/2003 | Sacca | G21F 7/005 312/1 |
| 2005/0168117 | A1 * | 8/2005 | Porret | B01L 1/02 312/291 |
| 2010/0052258 | A1 | 3/2010 | Hoeting | |
| 2011/0135231 | A1 | 6/2011 | Gerbaud | |
| 2012/0153610 | A1 * | 6/2012 | Young | A61L 2/26 285/41 |
| 2014/0150926 | A1 | 6/2014 | Nodin | |
| 2014/0230963 | A1 | 8/2014 | Simon | |

FOREIGN PATENT DOCUMENTS

| | | | |
|---|---|---|---|
| CN | 102149950 | A | 8/2011 |
| CN | 202031996 | U | 11/2011 |
| FR | 2 695 343 | A1 | 3/1994 |
| FR | 2 978 363 | A1 | 2/2013 |

OTHER PUBLICATIONS

International Search Report issued in Application No. PCT/EP2014/068477 dated Jan. 8, 2015.

Written Opinion issued in Application No. PCT/EP2014/068477 dated Jan. 8, 2015.

Office action issued in Chinese Patent Application No. 201480048759 dated Dec. 29, 2016.

* cited by examiner

FLUIDTIGHT CHAMBER COMPRISING AN OPENING AND CLOSING CONTROL MECHANISM FOR A DEVICE PROVIDING FLUIDTIGHT CONNECTION BETWEEN TWO ENCLOSED VOLUMES

TECHNICAL FIELD AND PRIOR ART

This invention relates to a sealed enclosure delimiting a closed space intended to be connected to another closed space, the sealed enclosure comprising an actuating mechanism for a device for the sealed connection between the two closed spaces.

In a certain number of industrial sectors, among which can be mentioned the nuclear, medical, pharmaceutical and agro-food sectors, it is required or desirable to perform certain tasks in a confined atmosphere, either in order to protect the personnel, for example from radioactivity, toxicity, etc., or on the contrary to be able to perform these tasks in an aseptic or dust-free atmosphere, or finally both simultaneously.

Transferring a device or product from one closed space to the other, without at any time the seal of each of these spaces with regards to the exterior being broken, raises a problem that is delicate to overcome. This problem can be resolved by a double door connection device.

Such a double door device provided with a multiple safety control is for example known in document FR 2 695 343. Each space is closed by a door mounted in a flange. Each door is secured to its flange by a bayonet connection and the two flanges are intended to be secured to one another by a bayonet connection.

In the case where one of the closed spaces is formed by a container and the other space by a glove box, the transfer is carried out in the following way. The flange of the container comprises on its outside periphery lugs intended to cooperate with an imprint of the flange of the glove box. The flange of the container is introduced into the flange of the glove box, the container is oriented in such a way as to have the lugs correspond with the imprint. A first rotation of the container according to the axis of its door makes it possible to secure the flange of the container to the flange of the glove box by the bayonet connection. By means of a second rotation of the container, according to the same axis and in continuity with the first rotation, the door of the container is pivoted in relation to the container, providing both a securing by another bayonet connection with the door of the glove box and a detaching of the new unit formed by the two doors side-by-side with regards to door and glove box flanges. A handle control located in the glove box makes it possible to unlock a safety mechanism and release the passage between the two spaces. In the case of an aseptic atmosphere, as the outside surfaces of the two doors are in contact with each other in a sealed manner, they cannot contaminate the interior of the spaces.

This device gives satisfaction. But, on the one hand it requires a movement of rotation of the container in order to secure the flange of the container to the flange of the glove box or of the cell. On the other hand, it requires a rotation movement in order to secure the door of the glove box and the door of the container. These rotation movements can be carried out manually. This can be problematic for certain containers due to their weight and/or encumbrance, as well as to the torque to be exerted in order to carry out the rotation. Moreover, the rotation of the container, causing a tipping of the content, prevents the transfer of certain components of the open bottle type or components that are sensitive to impacts.

A variant to the setting in rotation of the container is the setting in rotation of the cell flange. However, this variant has the disadvantage of requiring a system that makes it possible to block the container during the rotation of the cell flange and is often more cumbersome.

On the other hand, the step of putting into communication of the two spaces is carried out manually thanks to a control located in the glove box or in the cell. The operation of actuating the control can be difficult according to the location of the double door device on the enclosure. Furthermore, it can take up time since access is required to the interior of the glove box or of the cell.

In addition, on certain production lines which are isolated from the exterior environment, these actuating operations for the opening and closing of the double door sealed transfer system can be excessively restrictive, as they are excessively repetitive and require an excessive amount of effort.

Mechanisms for actuating the opening and the closing of a double door system installed outside of the enclosure have been proposed. They prevent the user from having to intervene in the confinement enclosure, which may contain a toxic environment, and therefore would make it possible to reduce the risks for the user.

These mechanisms implement motors. But they are often complex and have disadvantages in terms of maintenance, cleanability and encumbrance, for example when the motor is located inside the enclosure.

DESCRIPTION OF THE INVENTION

It is consequently a purpose of this invention to offer a device for the sealed connection between two closed spaces that is easy to manipulate, in particular by avoiding a rotation of one of the closed spaces in relation to the other.

The purpose of this invention is achieved by a device for the sealed connection between a first and a second closed spaces, with each closed space comprising an opening bordered by a flange and closed off by a door, with the door of the second closed space being mounted in a sealed manner in a flange by a bayonet connection, with the device comprising means of securing the two flanges and a control ring mounted outside of the first closed space around the flange, with the control ring controlling means of securing the two doors and of unlocking the door of the second space, means for releasing the other door and the opening of the two doors allowing for the sealed communication between the two spaces. The means of securing the two flanges and the control ring are mobile in rotation in relation to the closed spaces and through their rotation provide for all of the steps required to obtain a sealed connection and this without pivoting one of the closed spaces.

As such, thanks to the invention no rotation of the second closed space is required.

Advantageously, the means of securing the two flanges are formed by a securing ring that is concentric to the control ring.

Very advantageously, the actuating means the control ring and/or the means for actuating means of securing the two flanges are located outside of the closed spaces. These actuating means are therefore accessible.

Very advantageously, it is the same actuating means that actuate the control ring and the securing ring.

The connection device can more preferably comprise means for locking the two doors to one another when the latter are in a separated position of the flanges.

The connection device can advantageously also comprise means for axially maintaining the two flanges prior to the actuating of means of securing in order to facilitate later manoeuvres. Advantageously, this is one or several snap-fit devices.

A subject-matter of the present invention is then a device for the sealed connection between a first and a second closed space, with the first closed space comprising a first flange and a first door closing off in a sealed manner an opening delimited by the first flange, and the second closed space comprising a second flange and a second door closing off in a sealed manner a second opening delimited by the second flange, with the second door being secured to the second flange by a bayonet connection, with said connection device being mounted on a wall of the first closed space and comprising first means of securing the first and second flanges to one another, second means of securing the second door and the first door in a sealed manner and of detaching the second door from the second flange, third means for releasing the first door in relation to the first flange, fourth means for opening a passage between the first and the second closed space, a control ring able to be set in rotation around a longitudinal axis, with the rotation of said control ring actuating at least the second, third and fourth means, a first device for actuating said control ring and a second device for actuating the first means of securing.

More preferably, the first device for actuating and the second device for actuating are arranged outside of the first closed space.

In an advantageous example, the control ring is arranged outside of the first space and surrounds the first flange. The second, third and fourth means can then be arranged at the periphery of the first flange around the control ring.

According to an embodiment example, the first means can comprise a securing ring mounted mobile in rotation in relation to the first flange around the longitudinal axis and can comprise means of a bayonet connection in order to immobilise the second flange in relation to the first flange.

According to an embodiment example, the second means can comprise a securing plate mounted mobile in rotation on an outer surface of the first door around the longitudinal axis and able to be secured to an outer surface of the second door by a bayonet connection. In an embodiment, a first portion of the displacement in rotation of the securing plate secures the first door and the second door and a second portion of the displacement in rotation of the locking plate unlocks the second door in relation to the second flange.

For example, the second means can comprise at least one pinion meshing with an actuating sector gear carried by the control ring, with a displacement in rotation of the control ring causing a rotation of the securing plate.

The second means can also comprise a gear train coupled to the securing plate in order to place it in rotation, said gear train being driven by said pinion. Advantageously, the second means comprise a straight-toothed pinion meshing with the first sector gear and an angle transmission.

Advantageously, the connection device can comprise means for locking the first door and the second door to each other when they are separated from the first and second flanges. The locking means can comprise a finger mounted mobile in the securing plate, with the finger able to be retracted in the securing plate when the second door is arranged against the first door and able to protrude from the securing disc when the securing disc secures the first and the second door, with the finger blocking with a stop the rotation of the second door in relation to the first door. For example, the finger can comprise a roller and the locking means can comprise a cam carried by an outer surface of the first door providing for the return to retracted position of the finger in the securing disc in the separation phase of the first and second closed spaces.

According to an embodiment example, the third means can comprise a locking cam and a locking roller, with the locking roller able to take a position wherein it cooperates with the locking cam preventing the opening of the first door and a second position wherein it is separated from the locking cam, with the passing from the first to the second position and from the second position to the first position being caused by the rotation of the control ring.

According to another additional characteristic, the connection device can comprise an actuating roller cooperating with a radial cam surface of the control ring, causing the pivoting of the locking roller.

The locking cam can be for example secure with the first door and the locking roller is mounted mobile in rotation on the first flange around an axis parallel to the longitudinal axis.

According to an additional characteristic, the first door can be articulated in relation to the first flange around a hinge with an axis orthogonal to the longitudinal axis and the fourth means can comprise at least one pinion meshing with another actuating sector gear of the control ring, with the pinion being coupled to said hinge, with the displacement in rotation of the control ring causing a rotation of the first door around the hinge.

The connection device can advantageously comprise a system for the axial maintaining of the second flange on the first flange, prior to the securing by the first means. Advantageously, the system for the axial maintaining by snap-fitting comprises at least two devices for axial maintaining by snap-fitting. The second flange can then comprise at least two radially protruding portions, with each of the two protruding portions cooperating with a device for axial maintaining by snap-fitting.

In an embodiment example, the system for the axial maintaining by snap-fitting comprises at least one device for the axial maintaining by snap-fitting and a device for the passive axial maintaining or at least two devices for the axial maintaining by snap-fitting. The second flange can comprise at least two radially protruding portions, one protruding portion cooperating with the device for the axial maintaining by snap-fitting and one protruding portion cooperating with the device for the passive axial maintaining.

The device or devices for the axial maintaining by snap-fitting can for example comprise an actuating connecting rod, a locking connecting rod and means for blocking said locking connecting rod in locked position and means for activating means for blocking in order to release the locking connecting rod.

Preferably, the actuating of the second, third and fourth means for the purposes of a sealed connection between the two closed spaces is obtained by a unidirectional rotation of the control ring.

For example, the control ring comprises a driving gear sector cooperating with a pinion of the second actuating means.

Advantageously, the first device for actuating also forms the second device for actuating.

Preferably, the first and/or the second actuating means are motorised.

BRIEF DESCRIPTION OF THE DRAWINGS

This invention shall be better understood using the following description and annexed drawings, wherein.

DETAILED DESCRIPTION OF PARTICULAR EMBODIMENTS

The terms "upstream" and "downstream" are considered in the direction of the setting into place of the container in the connection device.

In the embodiment shown in the figures, the two closed spaces that are to be connected using a double door sealed connection device provided with the actuating mechanism in accordance with the invention correspond respectively to a confinement cell 10 and to a container 12. It is understood however that the invention also applies in the case where the closed spaces would for example be for one a glove box and for the other a container or two glove boxes.

Figure 12:
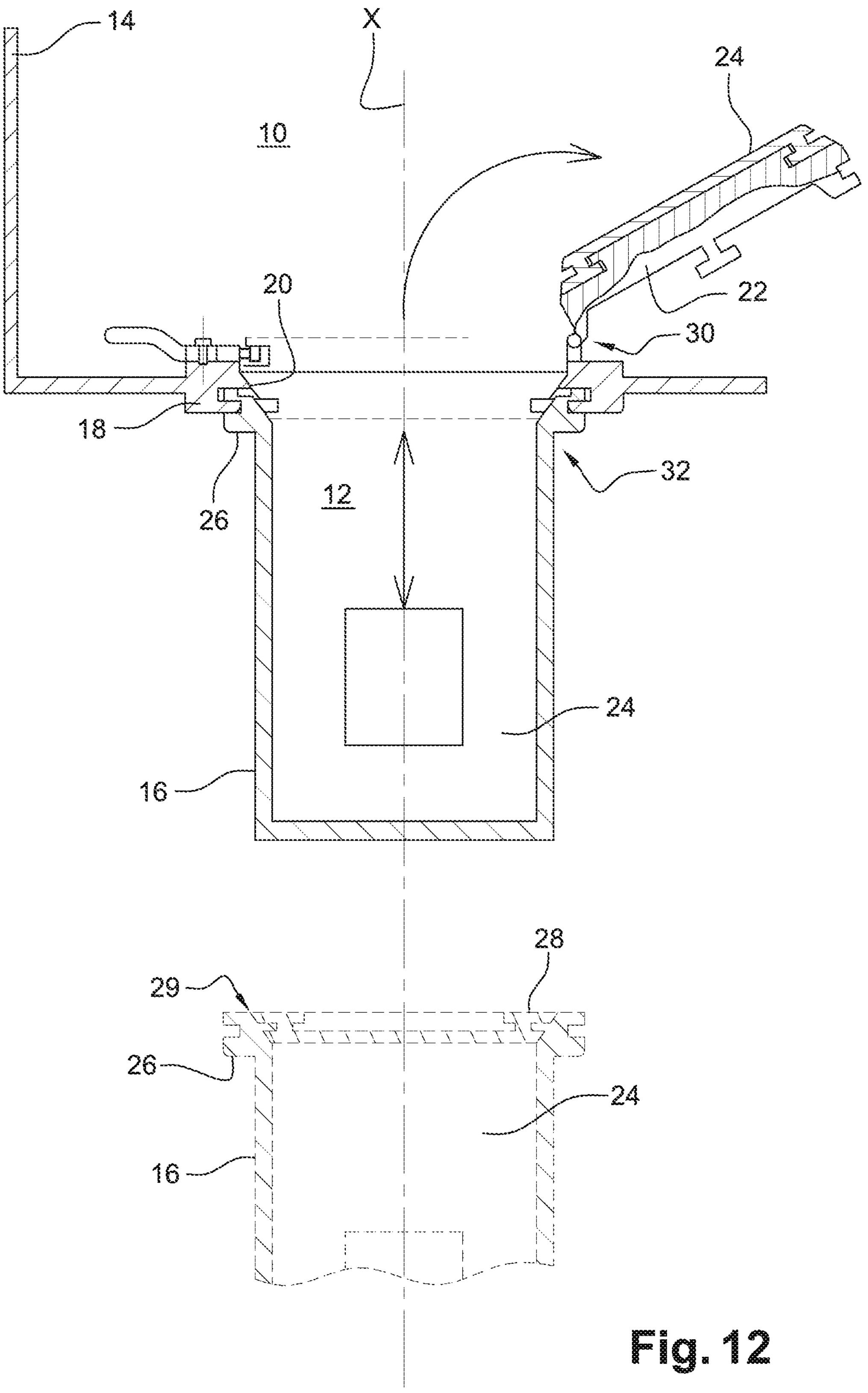
FIG. 12 is a longitudinal cross-section view diagrammatically showing the connection of a container onto a cell by means of a double door sealed connection device.

FIG. 12 diagrammatically shows the cell 10 and the container 12 in a connected state and in a disconnected state.

The cell 10 is delimited by a wall 14 of which only a portion can be seen in FIG. 12. It is provided, conventionally, with means for remote manipulation such as remote handling devices and/or gloves (not shown) secured to the wall 14. The container 12 is also delimited by a wall 16, as shown in particular in FIG. 12.

The cell comprises a cell flange 18 mounted in a sealed manner in a wall 14 of the cell and delimiting an opening 20 that is closed off in a sealed manner by a removable door 22, referred to as a cell door or door.

The container comprises a reservoir 24 and a container flange 26 that is closed off in a sealed manner by a removable door 28. For the purposes of clarity, the container door 28 shall be designated as "container cover" or "cover" in order to clearly distinguish it from the cell door. The reservoir 24, the container flange 26 and the cover 28 delimit a sealed space. The cover 28 is secured to the container flange by a bayonet connection 29.

The device for the sealed connection comprises the cell flange 18, the container flange 26, the cell door 22 and the container cover 28. The cell door 22 is articulated on the cell flange 18 by a hinge 30 with axis Y orthogonal to the longitudinal axis X.

The axial direction corresponds to the axis of the cell flange 18 and of the door 22, as well as that of the container flange 26 and of the cover 28 when the latter are secured to the cell. The axial direction is represented by the axis X which is the axis of the connection device.

FIGS. 1 to 11 show in detail an embodiment of a device for the sealed connection according to the invention. The connection device is mounted on the wall of the cell around the opening 20. The connection device is mobile in relation to the wall of the cell 14.

The connection device comprises first means A of securing the container flange 26 onto the cell flange 18.

In the example shown, the container flange 26 comprises four lugs 32 arranged at 90° from each other radially protruding towards the exterior of the container flange 26. The container flange 26 could comprise two lugs, three lugs or more than four lugs, furthermore the angular arrangement is not restrictive.

The first means A comprise a securing ring 100 mounted coaxial to the cell flange 18 onto the outer surface of the latter and able to pivot in relation to it around the longitudinal axis X.

In the example shown, the securing ring 100 comprises four imprints 102 intended to each receive a lug 32 of the container flange 26. The rotation of the securing ring 100 in the anti-clockwise direction provides a securing by bayonet connection between the container flange 26 and the securing ring 100 and therefore between the container flange 26 and the cell flange 18. The imprints 102 have a first portion extending axially 102.1 that allows for the inserting and the removing of the lugs 32 according to an axial direction and a second portion 102.2 extending laterally in relation to the axial portion in a downstream zone. The second portion 102.2 receives the lugs 32 when the securing ring 100 has pivoted, which provides an axial maintaining of the lugs 32 and therefore of the container flange 28 in relation to the cell flange 18.

In the example shown, the securing ring 100 is mounted mobile in relation on the cell flange 18 by means of four rollers 106. It is understood that the number of rollers is not restrictive.

Advantageously, sensors are provided in order to know the various states of the system: door closed, door open, door opening or closing, etc., for example by detecting the displacement and/or the position of the securing ring, more particularly in a motorised embodiment and in an embodiment wherein the operator would not be in a position to visually identify in what state the system is in.

The actuating mechanism comprises an actuating device 108 of the securing ring 100 in rotation around the longitudinal axis X.

The actuating device 108 is arranged advantageously outside of the cell in such a way as to be able to be activated by the operator from the exterior. In the example shown this actuating device 108 comprises a crank 110. Any other mechanical actuating device can be considered. According to a variant, it could be provided to motorise the actuating of the securing ring 100. The motorised means could also be located inside the cell.

The securing ring 100 comprises a radially exterior sector gear 112 which is engaged by a pinion 114 of the actuating device 108. This actuating device is simple and robust. Other means for transmitting the movement between the actuating means and the securing ring could be provided.

Very advantageously, the device for the sealed connection comprises a system for the axial maintaining of the container against the wall of the cell.

Preferably, this system for maintaining comprises at least one device for the axial maintaining with snap-fitting 34 intended to axially maintain the container flange 26 in relation to the cell flange 18, such as shown in the FIGS. 1 to 4E and 5.

This device for maintaining, designated in what follows as snap-fitting device, is intended to be implemented prior to the securing of the two flanges 18, 26 by the securing ring 100. For example, the device is particularly advantageous in providing for the maintaining of the container on the wall 14 of the cell when the container is intended to be positioned horizontally for example for the transfer. This snap-fitting device then makes the assembly of the container on the cell easier for the operator since he no longer has to maintain for example at the end of his arm the container until the container flange 26 is secured to the cell flange 18 by the securing ring 100.

In the example shown, the connection device comprises a snap-fitting device on two lugs 32 diametrically opposite the container flange 26. The snap-fitting devices 34 are located in a diametrically opposite manner on the cell flange 18.

In the FIGS. 3, 4A to 4E, an embodiment of a snap-fitting device 34 can be seen in more detail.

As the two snap-fitting devices are similar, only one of the two devices shall be described. The snap-fitting device 34 comprises a base 36 fastened onto the cell flange 18 at the periphery of the opening 20, an actuating connecting rod 38 articulated in rotation on the base 36 around an axis Y1 perpendicular to the axial direction and to the diametrical direction of the cell flange 18.

The snap-fitting device 34 also comprises a locking connecting rod 40 articulated in rotation on the base 36 around an axis Y2 parallel to the axis Y1, and a return means 42 restoring the locking connecting rod 40 to an unlocked position. The return means 42 is fastened to the base and to the locking connecting rod 40. The actuating connecting rod 38 and the locking connecting rod 40 are in contact by one of their ends 38.1, 40.1 respectively, in such a way that a pivoting of the actuating connecting rod 38 in the clockwise direction causes a rotation of the locking connecting rod 40 in the clockwise direction. The ends 38.2, 40.2 of the connecting rods are located on the side of the opening 20.

The snap-fitting device 34 also comprises means for locking in order to block the locking connecting rod 40 in a locked state. The locking means comprise a finger 44 articulated in rotation on the base 36 around an axis perpendicular to the axes Y1 and Y2 in such a way that an end of the finger 44 can move closer to and move away from the locking connecting rod 40. An elastic return means, such as a spring (not visible) pushes the finger 44 in the direction of the connecting rod. According to a variant, the finger 44 can be formed from a blade which is deformed elastically in flexion and integrating the elastic return means.

Figure 4A:
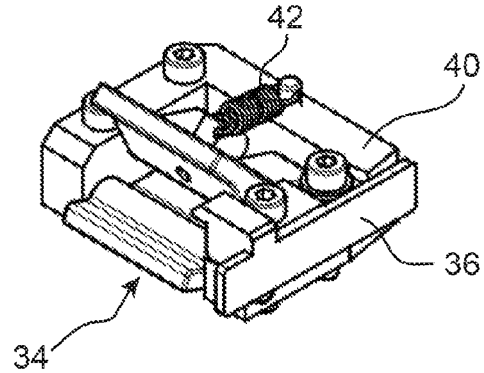
FIG. 4A is a perspective view of the means of axial securing by snap-fitting of FIG. 3.
Figure 4B:
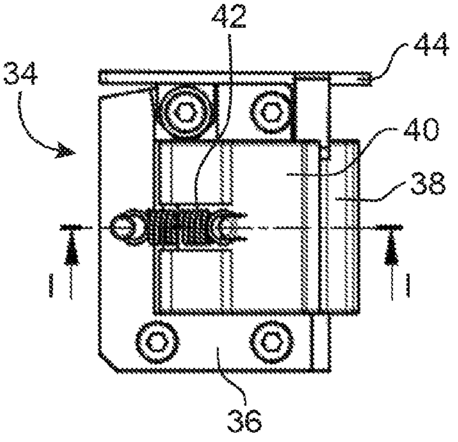
FIG. 4B is a top view of the means of securing of FIG. 4A.
Figure 4C:
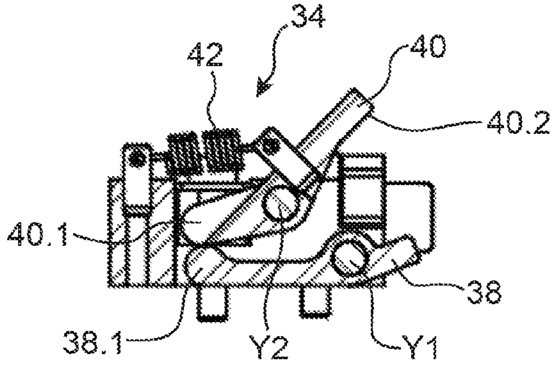
FIG. 4C is a cross-section view of FIG. 4B according to the plane I-I.
Figure 4D:
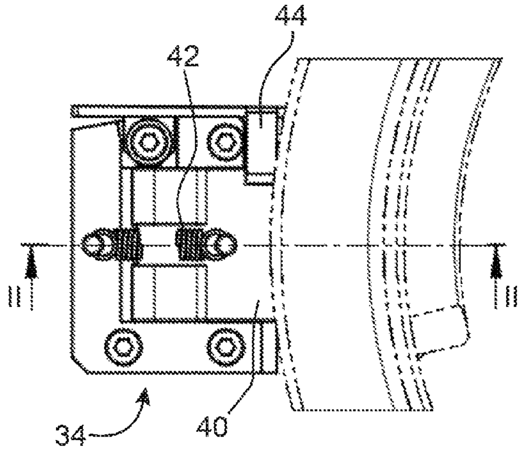
FIG. 4D is a top view of the means of securing of FIG. 4A, with the container in place.
Figure 4E:
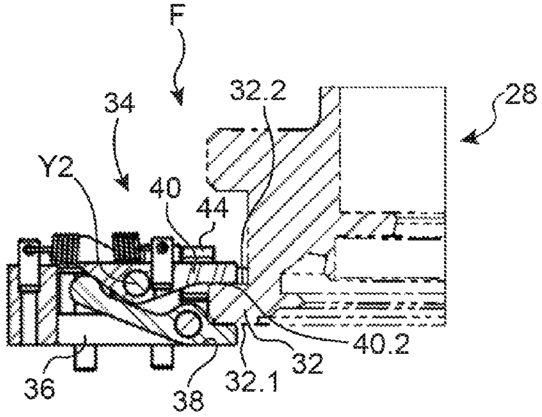
FIG. 4E is a cross-section view of FIG. 4D according to Ie plan II-II.
Figure 5:
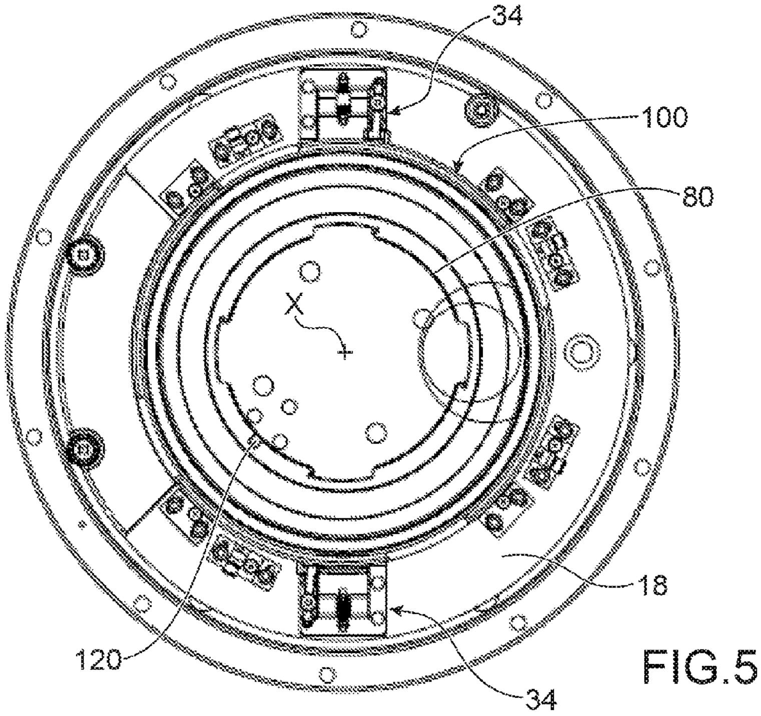
FIG. 5 is a front view of the cell flange and of the cell door and of the device for the sealed connection according to the invention, with the control ring and the actuating means omitted.

The operation of the snap-fitting device is as follows and is shown in FIGS. 4D and 4E. A lug 32 of the container flange 28 is brought closer according to the direction of the arrow F towards the snap-fitting device, until it bears via a first transverse surface against the actuating connecting rod 38. Under the effort applied by the lug 32 towards the cell 14, the actuating connecting rod 38 pivots around its axis Y1 in the clockwise direction, causing the rotation in the clockwise direction of the locking connecting rod 40 around its axis Y2. The locking connecting rod 40 then comes to bear by its other end 40.2 against a second transverse surface 32.2 of the lug 32 opposite the first transverse surface 32.1. The lug 32 is then axially maintained against the cell flange 18. Moreover, the pivoting of the locking connecting rod 40 in the clockwise direction is such that the finger 44 passes over the end 40.2 of the locking connecting rod 40 locking it by bearing against the lug 32. The finger 44 is pivoted in such a way as to separate the end 40.2 of the locking connecting rod 40 in order to release the latter. This releasing takes place when it is desired to detach the container from the cell flange. The pivoting of the finger 44 can be obtained by means of an actuator (not shown) or by a slight rotation of the container.

Another very advantageous embodiment of a snap-fitting device 34' can be seen in FIGS. 14A to 14F, this device differs from device 34 in that it uses a locking cam. The number of moving parts is reduces, reliability of the device is then increased and the manufacturing is easier.

The snap-fitting device 34' comprises a base 36' fastened onto the cell flange 18 at the periphery of the opening 20, an locking cam 40' articulated in rotation on the base 36 around an axis Y2' perpendicular to the axial direction and to the diametrical direction of the cell flange 18, and a return means 42 restoring the locking cam 40' to an unlocked position. The return means 42 is fastened to the base and to the locking cam 40'.

The locking cam 40' comprises on its face which is oriented towards the longitudinal axis of the device a downstream area 40.1' in the direction of insertion of the flange in the snap-fitting device, which forms an actuating area, and an upstream area 40.1 which forms an abutment.

The actuating area 40.1' forms a cam surface which protrudes towards the inside of the device in an unlocking position, in such manner that, when the container flange is brought closer towards the snap-fitting device, one of the lugs 32 bears against the cam surface 40.1', resulting in its rotation, the abutment area 40.1' then faces the rear face of the lug, more preferably bears against the rear face of the lug, preventing the withdrawal of the lug.

The snap-fitting device 34' also comprises means for locking in order to block the locking cam 40" in a locked state. The locking means comprise a finger 44' articulated in rotation on the base 36' around an axis perpendicular to the axe Y2' in such a way that an end of the finger 44' can move closer to and move away from the locking connecting rod 40'. An elastic return means, such as a spring (not visible) pushes the finger 44' in the direction of the connecting rod. According to a variant, the finger 44' can be formed from a blade which is deformed elastically in flexion and integrating the elastic return means.

The operation of the snap-fitting device is as follows and is shown in FIGS. 14C to 14F.

A lug 32 of the container flange 28 is brought closer according to the direction of the arrow F towards the snap-fitting device, until it bears via a first transverse surface against the cam surface 40.1'. Under the effort applied by the lug 32 towards the cell 14, the locking cam 40' pivots around its axis Y2' in the clockwise direction. The abutment area 40.2' bears against the rear face of the lug 32 The lug 32 is then axially maintained against the cell flange 18. Moreover, the pivoting of the locking cam 40' in the clockwise direction is such that the finger 44' passes over the abutment area 40.2' locking it by bearing against the lug 32. To release the locking cam 40', finger 44 is separated from the abutment area. This releasing takes place when it is desired to detach the container from the cell flange. The pivoting of the finger 44' can be obtained by means of an actuator (not shown) or by a slight rotation of the container.

In the example shown, two devices for the axial maintaining by snap-fitting are provided.

In an advantageous variant, a single device for the axial maintaining by snap-fitting can be provided and in place of the second snap-fitting device a base comprising a groove in the shape of an arc of circle that opens radially towards the longitudinal axis X able to house a lug 32 and to maintain it axially. A lug is then engaged in the groove, providing its axial maintaining, then the other lug 32 is engaged in the snap-fitting device.

According to a variant, the system for the axial maintaining could implement magnetic means, the cell flange 18 and the container flange 26 would then be maintained by magnetisation.

More preferably, in the case of a vertical cell wall, the device for the axial maintaining by snap-fitting is located in the lower zone of the cell flange and the base provided with the groove is located in the upper zone of the cell flange.

According to a variant, a system with more than two devices for the maintaining by snap-fitting can be considered.

Particularly advantageously, the snap-fitting device or devices cooperate with the securing ring 100.

Figure 1:
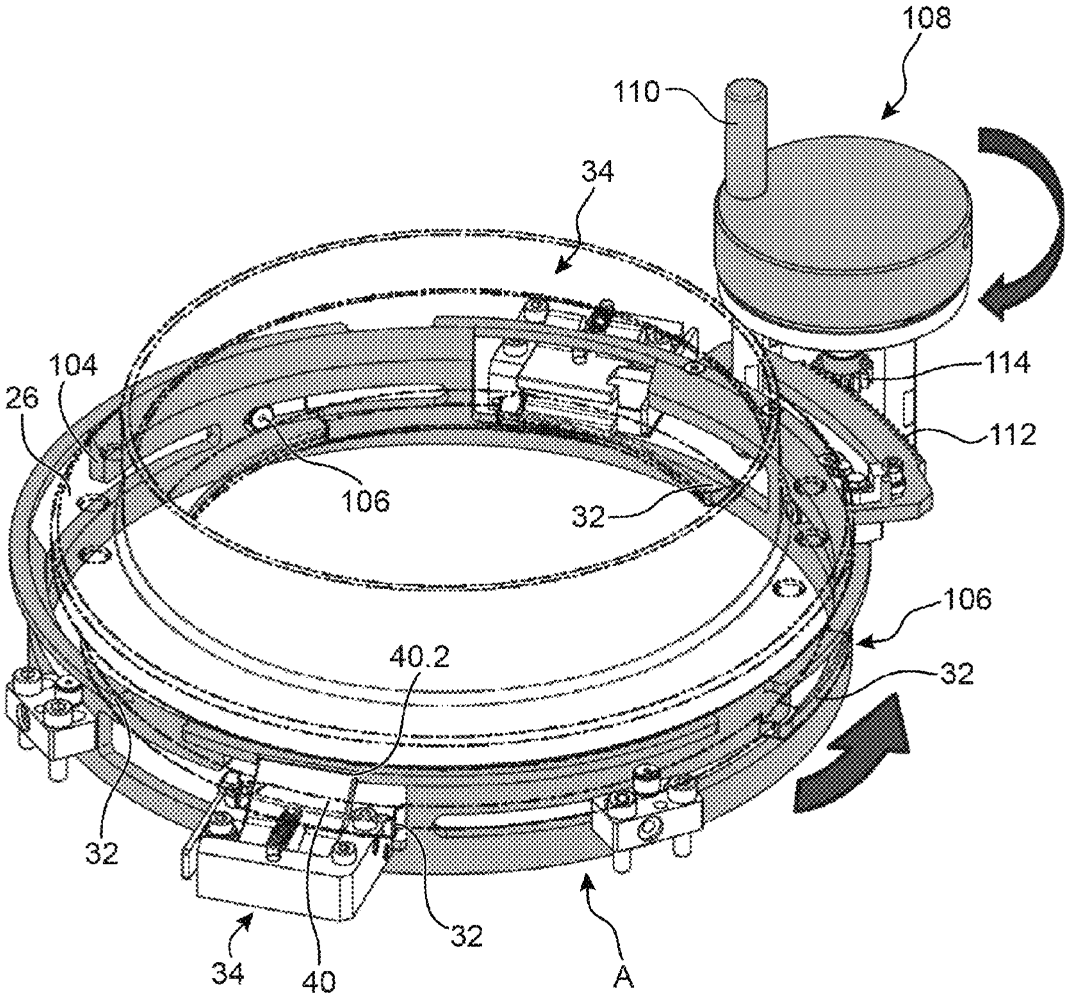
FIG. 1 is a perspective partial view of an embodiment example of a connection device between a cell and a container, with the container being shown as a dotted line.
Figure 3:
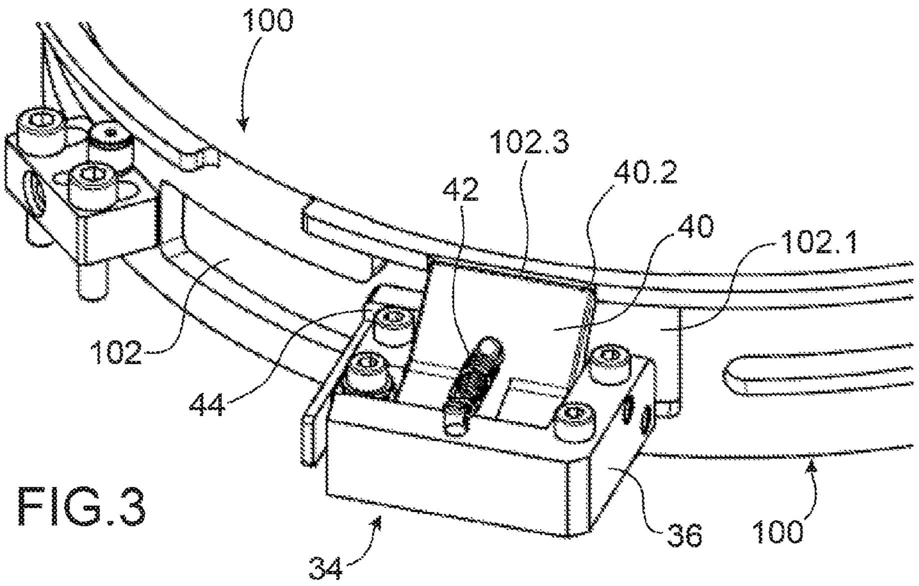
FIG. 3 is a detailed view in perspective of the means of axial securing by snap-fitting of the container flange and of the cell flange of the device for the sealed connection.

As is shown in FIGS. 1 and 3, the snap-fitting devices are located downstream of two imprints radially opposite the securing ring 100, in the direction of insertion of the lugs 32 into the securing ring 100.

As such, after the lugs 32 have been introduced into the imprints 102, they engage the actuating connecting rods 38 which causes the tipping of the locking connecting rods, maintaining the lugs axially.

In the absence of the container flange, the end 40.2 of the locking connecting rod 40 is located in the upper zone of the first portion 102.1 of the window 102 when no container is in place and penetrates into a notch 102.3 made in the first portion 102. The locking connecting rods 40 thus also provide a locking in rotation of the securing ring 100 in the absence of a container. As such, any manipulation of the ring 100 in the absence of the container is avoided.

In this particularly advantageous embodiment, the container flange 26 is maintained axially by the snap-fitting device or devices 34 and then the cell flange 18 and the container flange 26 are secured by the securing ring 100.

The snap-fitting maintaining devices are very advantageous in particular when the cell wall is in a vertical or inclined plane, as such when the container is maintained by the means 34, the operator can easily actuate the first means A.

The device for the sealed connection also comprises second means B intended to secure the container cover 28 and the cell door 22 and to unlock the cover.

The connection device also comprises third means C in order to release the cell door from the cell flange, and fourth means D for releasing the passage between the inside of the container and the inside of the cell.

The device for the sealed connection advantageously has a common actuating system of the second and third means.

The common actuating system is formed by a control ring 48 mounted in rotation on the cell flange 18 around the axial direction and arranged outside of the cell in the example shown. In the example shown, the control ring 48 is a ring gear of which the teeth are oriented radially outwards from the control ring 48. The common actuating system comprises a device for actuating intended to place in rotation the control ring 48 around the longitudinal axis X. Very advantageously, the device for actuating is formed by the device for actuating 108 of the securing ring 100, which makes it possible to simplify the structure and reduce is cost price. According to a variant, a separate device for actuating can be provided.

Figure 2:
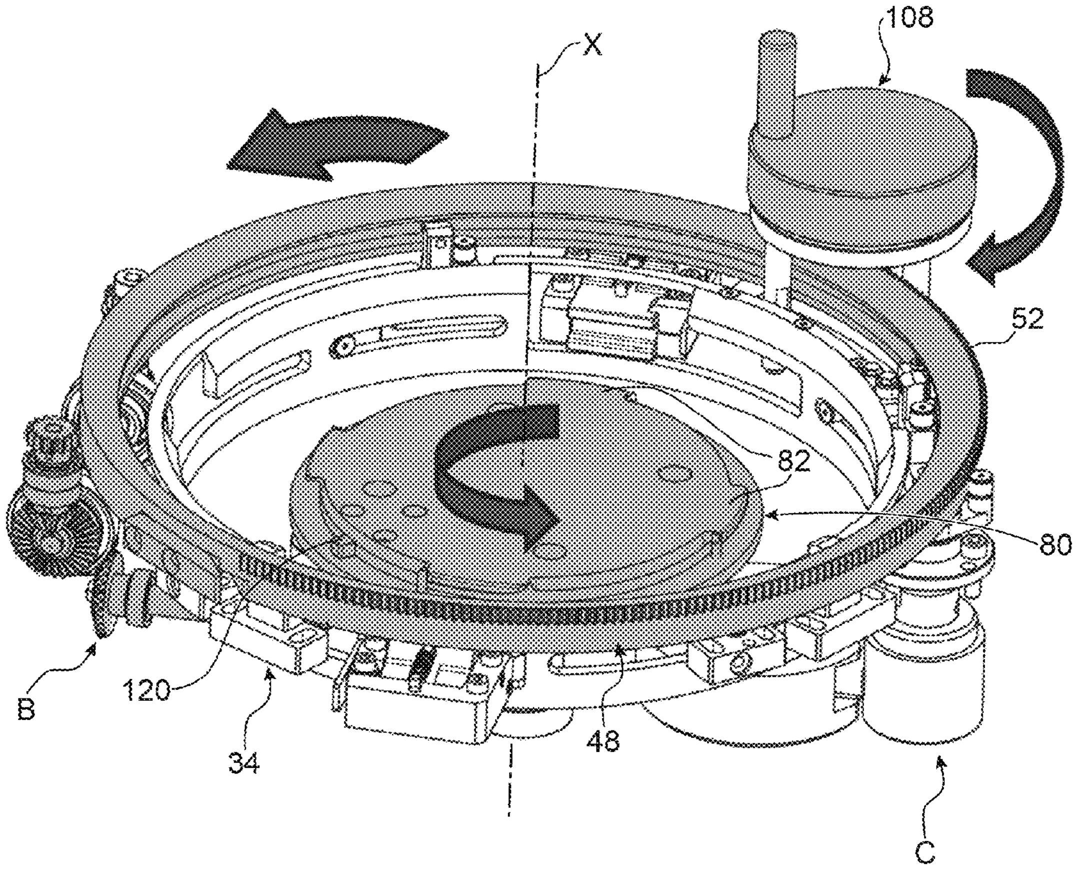
FIG. 2 is a perspective view of the device for the sealed connection seen from the exterior of the cell.

FIG. 2 shows the ring gear 48. The latter is mounted upstream of the securing ring 100 in the direction of the setting into place of the container and has an inner diameter that is greater than the outer diameter of the securing ring 100 in order to allow for the penetration of the container flange 28 into the securing ring 100.

Figure 6:
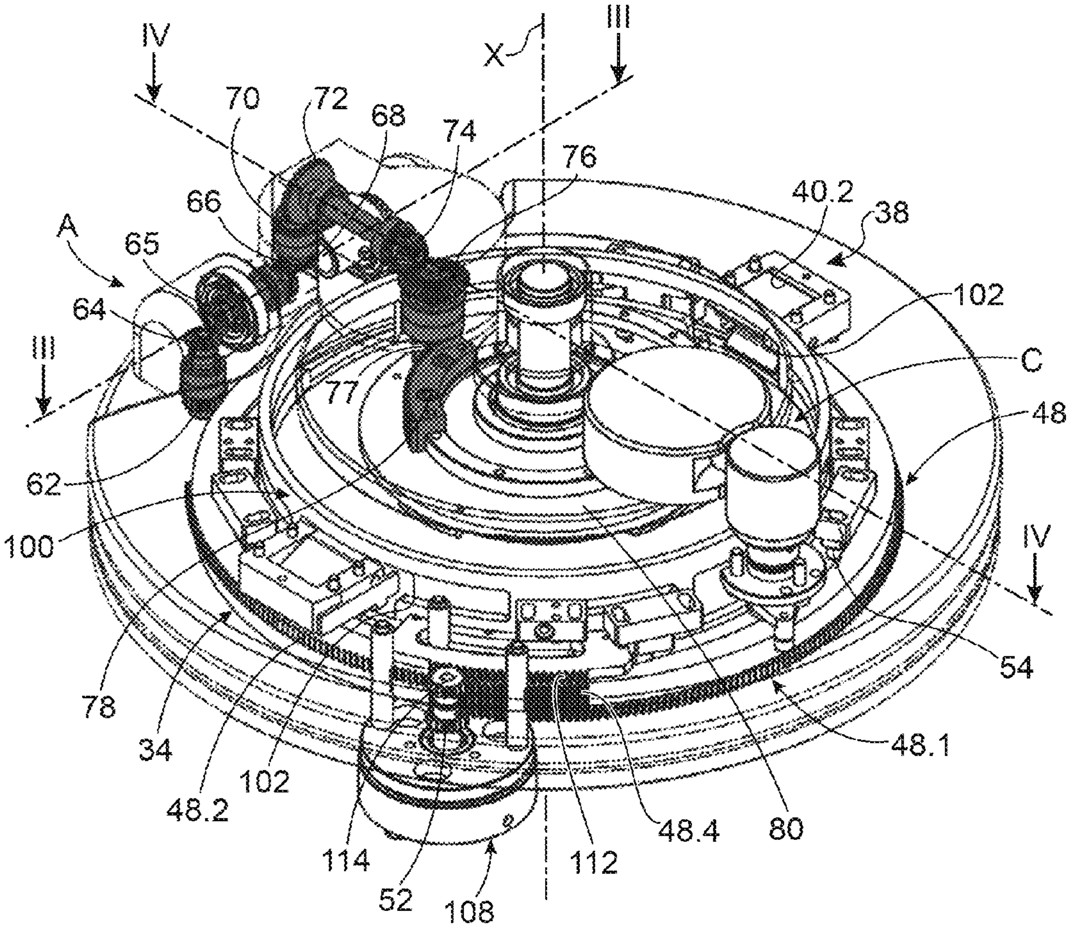
FIG. 6 is a perspective view of the device for the sealed connection seen from the interior of the cell, with certain elements being shown with transparency.

FIG. 6 shows the connection device from the interior of the cell, with the protective cover being shown with transparency.

The securing ring 100 can be seen of which the sector gear 112 is engaged by the pinion 114 and the ring gear 48 is engaged by a pinion 52 coaxial to the pinion 114.

The control ring 48 comprises a driving tooth 48.1 meshing with the pinion 52 which provides for its putting into rotation and sector gears intended to actuate the various means of the connection device. In the example shown, the sector gear 48.1 extends over only a portion of the periphery of the control ring 48, the angle on which extends the drive sector is determined in order to allow for the actuating of the various means B, C, D. According to a variant a drive sector could cover the entire periphery of the control ring 100.

The control ring 48 is advantageously maintained axially and radially by rollers 54 which allow for the rotation of the ring gear 48 around the axial direction while still limiting friction.

The second B, third C and fourth D means are arranged on the periphery of the ring gear 48 and are actuated successively by setting the ring into rotation.

The second means B of securing the cell door 22 and the cover of the container 28 comprise an inter-door securing plate designated as 80.

The inter-door securing plate 80 is mounted in rotation on the cell door 22. The locking of the cell door 22 and of the container cover 28 is obtained by a bayonet connection. In the example shown, the securing plate 80 comprises four lugs 82 radially protruding outwards and the cover 28 comprises a hollow imprint provided with four radially external notches in order to receive the lugs of the securing plate 80 and a peripheral groove that connects the notches. A relative rotation of the securing plate 80 and of the cover 26 provides an at least partial masking of the lugs of the securing plate 80 forming an axial abutment for the lugs 82 and an axial securing of the securing plate and of the cover The securing plate 80 is set into rotation by the actuating of the control ring 48. In the example shown, the second means B comprise a straight-toothed pinion 62 engaged by a first actuating sector gear 48.2 of the control ring 48, a bevel pinion 64 secured in rotation with the pinion 62. In the example shown, they are located at the two ends of the same axis. The bevel pinion 64 meshes with a bevel pinion 65 which forms the input of a chain of gears, with the gears designated as 66, 68, 70, 72, 74, 76, 77. The pinion 77 meshes with a sector gear or rack 78 secured in rotation with the inter-door securing plate 80 as can be seen in FIG. 6.

The unit formed by the pinion 62, 64 and the chain of gears makes it possible to reduce the rotation torque of the handle and facilitate the manipulation by the operator.

Figure 13A:
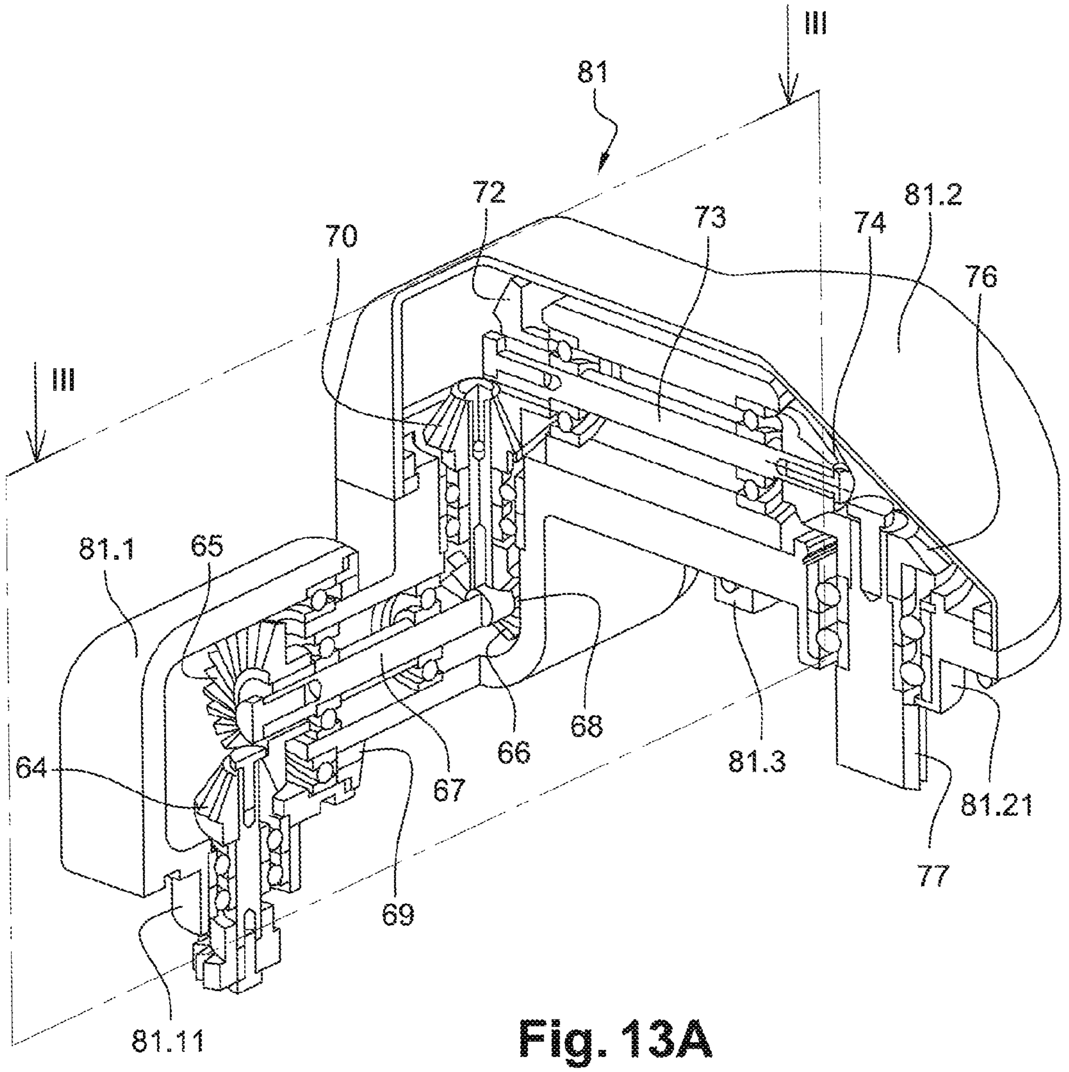
FIG. 13A is isometric perspective view with a partial cross-section of a cover of the connection device shown alone.
Figure 13B:
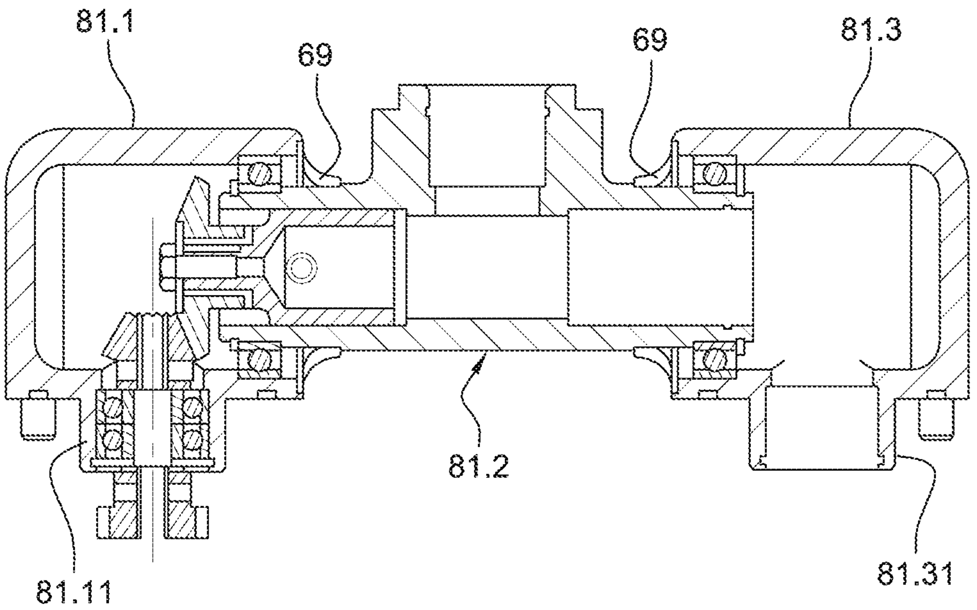
FIG. 13B is a cross-section view according to Ie plan III-Ill of FIG. 13A.
Figure 14A:
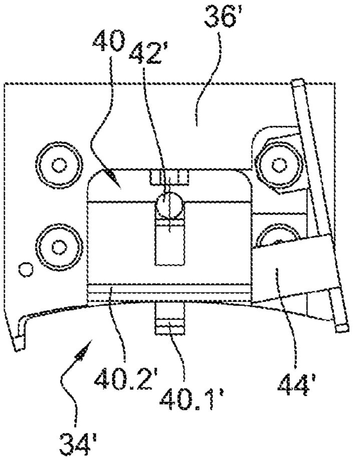
FIG. 14A is a top view of another embodiment of the means of axial securing by snap-fitting.
Figure 14B:
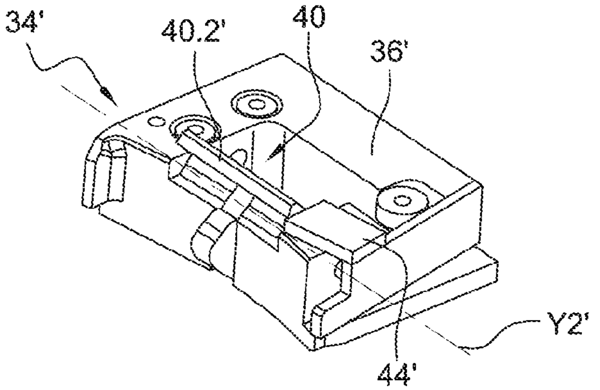
FIG. 14B is a perspective view of the securing means of FIG. 14A.
Figure 14C:
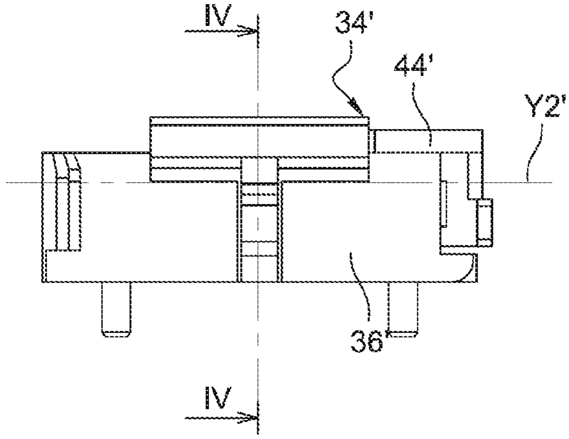
FIG. 14C is a front view of the securing means of FIG. 14A in an unlocked state.
Figure 14D:
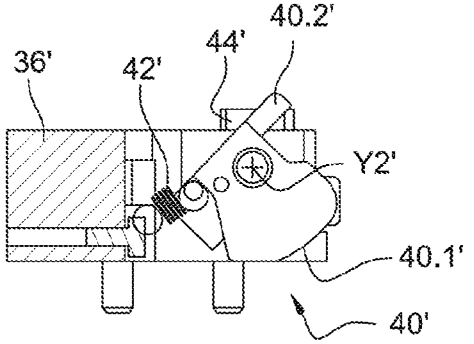
FIG. 14D is a cross-section view according to Ie plan IV-IV of FIG. 14C.
Figure 14E:
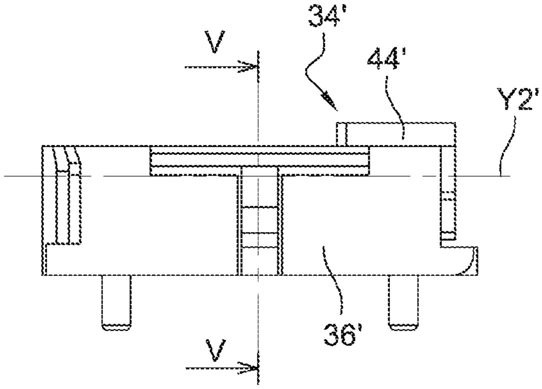
FIG. 14E is a front view of the securing means of FIG. 14A with the container in place but which is not shown.
Figure 14F:
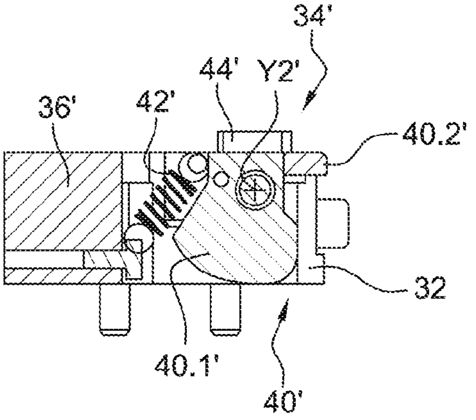
FIG. 14F is a cross-section view according to Ie plan V-V of FIG. 14E.

On FIGS. 13A and 13B, the chain of gears allowing for the rotation of the securing plate 80 is shown alone. The chain of gears is located in a cover 81 which is also shown on FIGS. 6-8 and 10, ensuring the sealed passage of the chain of gears between the outside and the inside of the cell. The cover comprises three parts 81.1, 81.2, 81.3 which are linked to each other in a sealed manner by means of seals 69.

In the example shown, parts 81.1 and 81.3, so-called blocks are identical. Part 81.2 which is located between parts 81.1 and 81.3 is called "arm".

The linkages between block 81.1 and arm 81.2 and between block 81.2 and 81.3 allow for the opening of the door 22. Rotation is ensured by roller bearings, but bearing may be used instead of roller bearings.

Chain of gears is located in block 81.1, the chain of gears controlling the securing plate 80. Opening means D is located in block 81.3.

In the example shown, block 81.1 comprises a sleeve 81.11 surrounding the axis connecting gears 62 and 64.

Block 81.3 also comprises a sleeve 81.31 (FIG. 13B).

Arm 81.2 surrounds the axis connecting gears 76 and 77. Sleeves 81.11 and 81.21 pass through the cell flange and through the door respectively in a sealed manner, static seals are mounted between the sleeves 81.11, 81.31 and the cell flange and between the sleeve 81.21 and the door 22.

According to a variant and in the specific case of device having a small diameter for which strength are reduced, the cover can have only one block and one arm, the opening means D being combined with the securing means B. In this case, block can be made in one piece with the cell flange. No seal is then required to carry out sealing between the block and the flange.

The chain of gears comprises two biggest axes 67, 73 between gears 65 and 66 and between gears 72 and 74 respectively. According to a variant, these axes and the gears can be replaced by chain sprockets or by pulleys with belt system or chain system.

A first phase of the rotation of the inter-door securing plate 80 provides the axial locking of the door 22 and of the cover 28 and a second phase of rotation of the securing plate 80 drives in rotation the cover 28 in relation to the container flange 26 and provides an unlocking of the cover 28 in relation to container flange 26.

Particularly advantageously, the mechanism comprises means 118 for locking that prevent the detaching of the cell door 22 and of the cover 28 when the passage between the inside of the container and the inside of the cell is open, i.e. when the door and cover unit is in detached position from the cell and container flanges.

Figure 7:
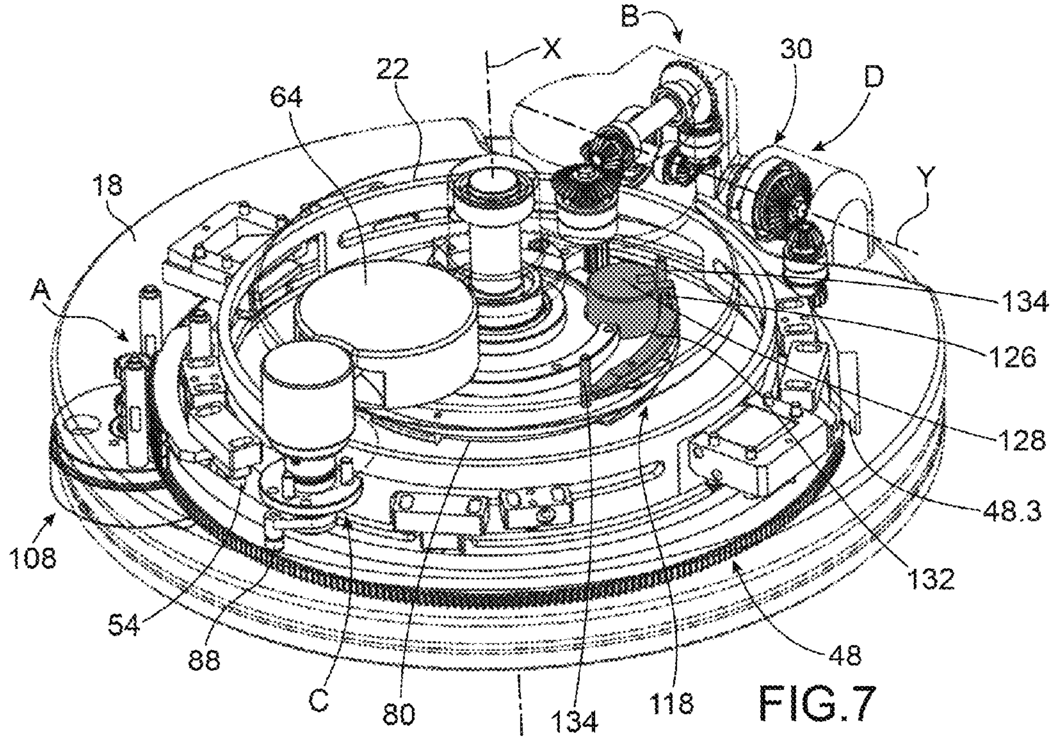
FIG. 7 is a perspective view of the device for the sealed connection seen from the interior of the cell, with certain elements being shown with transparency according to a point of view different from that of FIG. 6, in an unlocked position of the cell door and of the container door.
Figure 9:
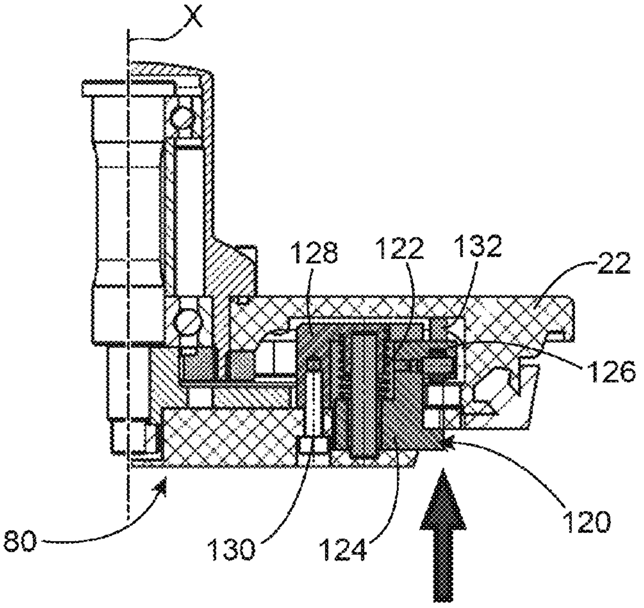
FIG. 9 is a cross-section view of the means for inter-door locking along the plane in an unlocked state.

The means 118 can be seen in FIG. 7 and as a cross-section in FIG. 9.

The locking means 118 are arranged between the upstream surface of the cell door and the downstream surface of the plate 80.

The locking means 118 comprise a finger 120 radially protruding from the plate 80 in a zone between two lugs of the plate 80. The finger 120 is able to be axially retracted inside the plate. An elastic means 122, for example a helical spring in the example shown, returns the finger outwards from the plate 80 upstream. The finger can be seen in FIG. 2.

The locking means comprise a roller support 124, carrying the finger 120, which is arranged between the door 22 and the plate 80 and a roller 126 able to roll around an axis perpendicular to the longitudinal axis X.

The locking means 118 also comprise a frame 128 fastened onto the plate 80 which carries an axis 130 parallel to the longitudinal axis X whereon is mounted and able to slide the roller support 124. The spring 122 is mounted in compression between the roller support 124 and the frame 128 around the axis 130.

The locking means 118 also comprise a cam 132 formed by a ramp fastened onto the upstream surface of the cell door, with the cam 132 having the shape of an arc of circle centred on the longitudinal axis X. The locking means also comprise stops 134 located across from the ends of the ramp 132. In the example shown, the stops 134 are formed by rods parallel to the longitudinal axis and fastened onto the cell door.

The operation of the locking means 118 is as follows.

During the positioning of the container flange 26 into the securing ring 100, the lugs of the container cover 28 are placed between the lugs 82 of the securing plate 80, one of them comes into contact with the finger 120 and due to the axial displacement of the container pushes the finger 120 which penetrates into the plate 80 against the restoring force of the spring 122. The roller 126 is released from the cam 132 and from one of the stops 134.

Figure 8:
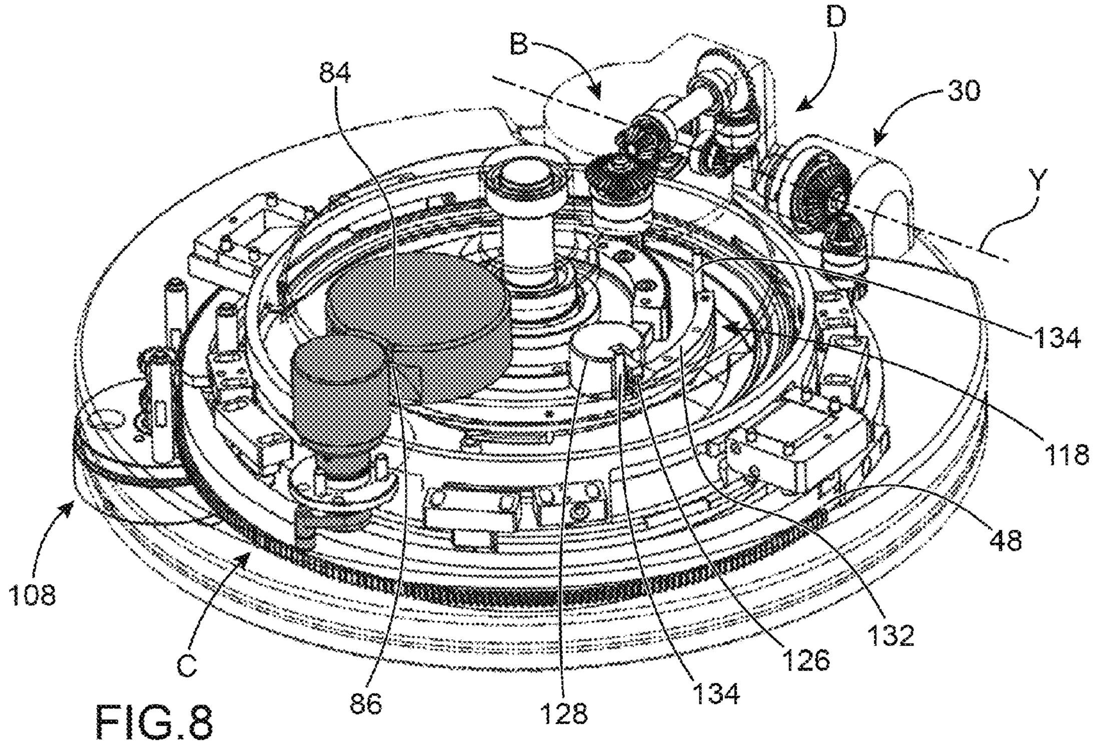
FIG. 8 is a view similar to that of FIG. 7, with the device for the sealed connection shown in a locked position of the cell door and of the container door.

Another rotation of the ring gear 48 causes a rotation of the plate, the roller 126 is also driven in rotation and rolls on the cam 132 until the roller 126 is positioned in the bottom part of the cam 132 (FIG. 8).

The finger has then pivoted enough to no longer be facing the lug 82 of the plate 80. However due to the restoring force of the spring 122, the finger is pushed back towards the exterior of the disc and forms a stop in rotation for the lug which is then blocked between the finger 120 and one of the stops 134.

Figure 10:
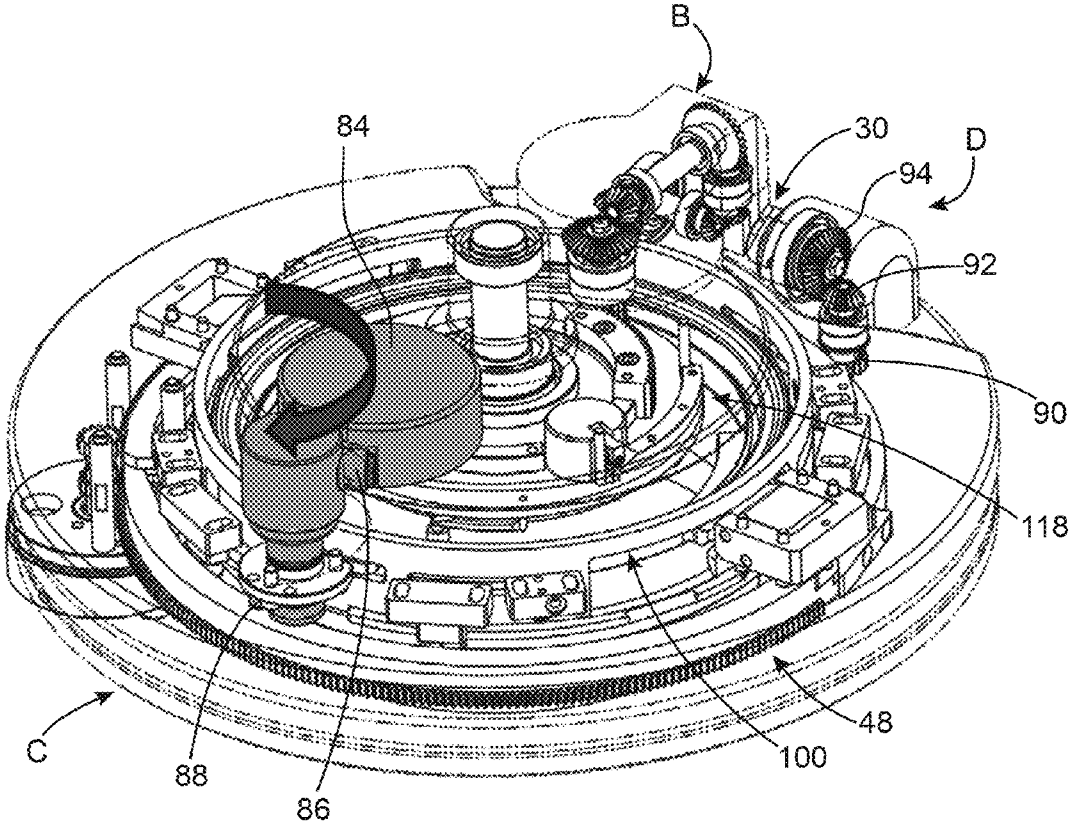
FIG. 10 is a perspective view of the device for the sealed connection seen from the inside of the cell, with certain elements being shown with transparency according to a point of view different from that of FIG. 6, in an unlocked position of the cell door in relation to the cell flange.

The third means C for maintaining the door of the cell closed against the cell flange 18 can be seen for example in FIG. 8 in closed position and in FIG. 10 in open position.

The door 22 is locked in closed position on the cell flange 18 by means of a locking cam 84 which is fastened onto the inside surface of the cell door 22 and of locking roller 86. The locking roller 86 is mounted mobile in rotation on the cell flange 18 around an axis parallel to the axial direction X between a locked position wherein the locking roller 86 is in contact with the locking cam 84 and locks the door in closed position against the cell flange 18, and an unlocked position, wherein the locking roller 86 is separated from the locking cam, and allows for a disengagement of the cell door from the cell flange 18.

The locking roller 86 is carried by a roller-holder of which an axial end comprises an actuating roller 88 which cooperates with a radial cam surface 48.3 of the toothed wheel 48.

According to a variant, it could be provided that the locking roller-holder comprises a pinion meshing with a sector gear of the toothed wheel.

Advantageously, in locked position, the locking cam 84 cooperates with safety means mounted on the inside surface of the door in order to detect the locked position of the cam 84. The third means D in order to open the door 22 and the cover 28 and as such allow for the sealed transfer between the container and the cell, can be seen in FIGS. 7 and 11.

The means for opening D set into rotation the cell door 22 and the cover 28 secured to one another by the securing plate 80 around the hinge 30. In the example shown, the means D comprise a first straight-toothed pinion 90 meshing with a second sector gear 48.4 of the ring gear 48 a bevel pinion 92 secured in rotation with the pinion 90. In the example shown, they are located at the two ends of the same axis. The bevel pinion 92 meshes with a bevel pinion 94 coaxial to the axis of the hinge 30 and secure in rotation with the latter. As such the ring gear 48, by driving the pinion 90, causes a rotation of the bevel pinion 94 which drives the cell door 22 in rotation around its hinge 30 and allows for the transfer between the inside of the container and the inside of the cell.

Seals are provided between the cover and the container flange, between the cell door and the cell flange and between the outer faces of the cell door and of the cover in such a way as to provide a sealed contact between the door 22 and the cover 28 and to provide a confining of these surfaces which are in contact with the outside environment when they are not in contact.

The ring gear 48 is comprised of several actuating angular sectors, with each one controlling separate means. According to the angle of rotation of the ring gear, a pinion is engaged by the ring gear driving the given means. The means are not actuated simultaneously but successively and in an order given by the arrangement of the angular sectors in a given direction of rotation. In the example shown, the actuating sector gears are arranged in separate planes perpendicular to the longitudinal axis X, which are separate from the plane that contains the gear sector drive.

A cycle for the putting into communication of the interior space of the container and of that of the cell thanks to the connection device according to the invention shall now be described, considering a vertical cell wall.

The container flange 26, wherein is arranged the cover 28, is introduced into the securing ring 100, the lugs 32 of the container flange 26 penetrate into the imprints 104. One of the lugs drives the finger 120. Furthermore, two lugs 32 diametrically opposite come into contact with the actuating connecting rods 38, cause them to pivot in the clockwise direction and the pivoting of the locking connecting rods 40. The finger 42 blocks the locking connecting rods 40 in position. The container flange 26 is then maintained against the wall 14 of the cell. The operator can let go of the container.

The operator then turns the crank 108 in the clockwise direction, which sets into rotation the securing ring 100 in the anti-clockwise direction, which is free to turn, then the locking connecting rods 40 have tipped, their ends 40.2 being released from the notches 102.3. The securing ring 100 rotates, the lugs 32 are then maintained by a bayonet connection thanks to the securing ring 100. The container flange 26 is then secured to the cell flange 18.

Then, the operator again turns the crank 108 in the clockwise direction, which sets into rotation the ring gear 48 in the anti-clockwise direction, the sector gear 48.2 meshes with the pinion 52 which causes the rotation of the securing plate 80. The plate 80 then provides the securing of the cell door 22 and of the container cover 28. Simultaneously the roller 126 rolls on the ramp 132 until its bottom position and the finger 120 is pushed back towards the exterior of the plate 80 (FIG. 10), one of the lugs of the cover 28 is then blocked between a stop 134 and the finger 120. No rotation of the cover 28 in relation to the door is possible in the absence of manipulation of the locking plate.

The operator again turns the crank 108 in a clockwise direction, the sector gear 48.2 moves away from the pinion 62 and the radial cam path encounters the actuating roller 88 causing a pivoting of the roller-holder and a separation of the locking roller 86 from the locking cam 84. The door 22 is then released from the cell flange 18.

The operator again turns the crank 108 in the clockwise direction, the sector gear 48.4 meshes with the pinion, causing the rotation of the door 22 and of the cover 28 around the hinge 30.

Figure 11:
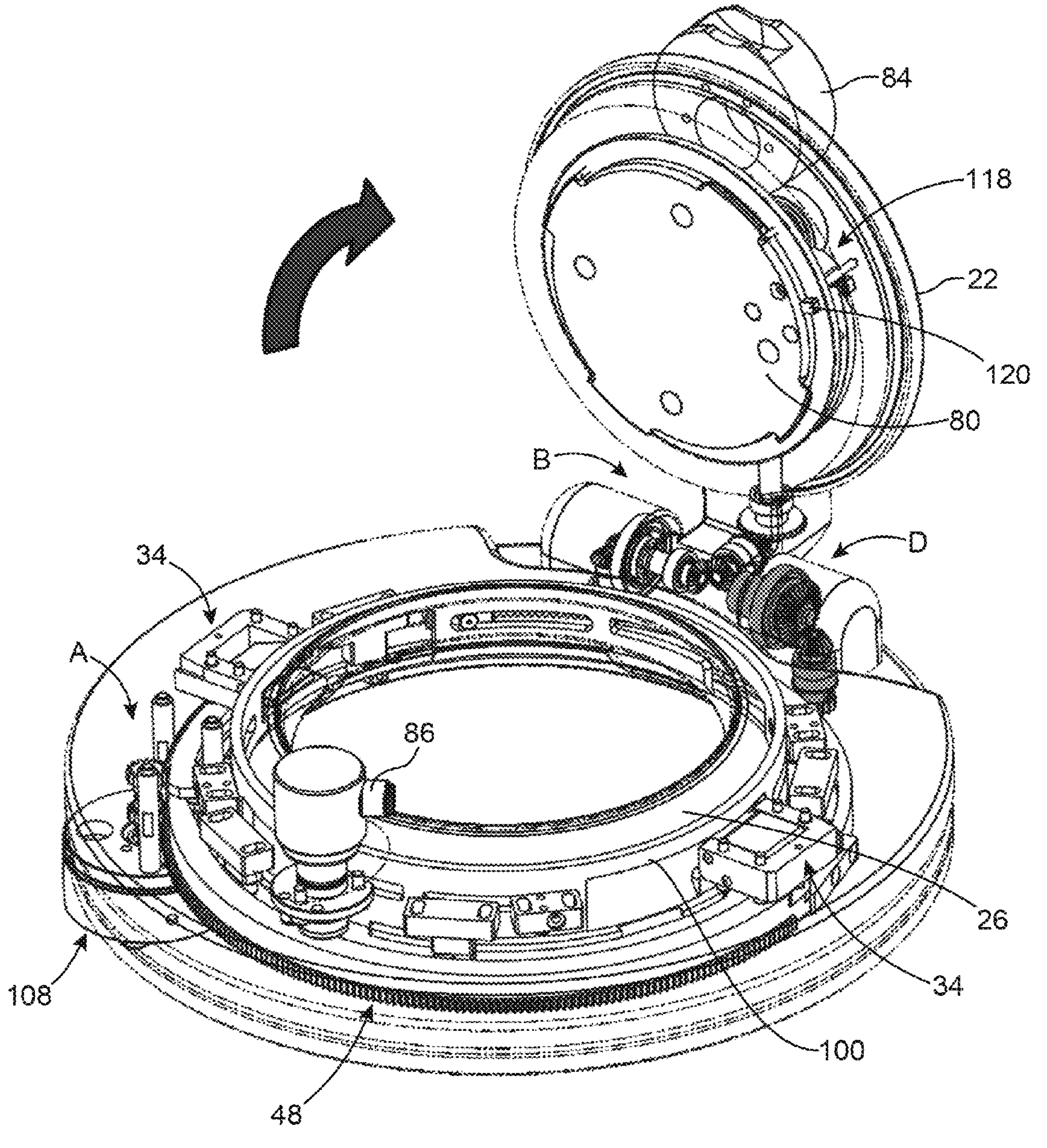
FIG. 11 is a perspective view in open position of the connection device, with the container cover omitted.

The passage between the inside of the cell and the inside of the container is then open as is shown in FIG. 11 (the cover 26 is not shown).

In this position, the cover cannot be separated from the door due to the presence of the finger 120. As explained hereinabove, the movement of a lug of the cover 28 is limited by the finger 120 and a stop 134. The cover 26 therefore cannot pivot enough in relation to the door 22 in order to separate them. The retracting of the finger 120 is possible only by setting the securing plate 80 into rotation in the opposite direction, but this rotation in the opposite direction is possible only after closing of the access between the two spaces. Consequently, the separation of the cover and of the door is prevented when the passage between the cell and the container is open. As such there is no risk of pollution of the interior of one or the other of the spaces by the outer surfaces of the cell and of the container.

The closing of the passage and the separation of the container from the cell is carried out according to the steps hereinabove in the reverse order. For this, the operator pivots the crank 108 in an anti-clockwise direction, causing:

- the putting back into place of the door 22 and of the cover 28 in their respective flange 18, 26,
- then the returning into position of the locking roller 86 in the locking cam 84,
- the rotation in the clockwise direction of the plate 80 which locks the cover 28 in the container flange 26 and the detaching of the door 22 and the cover 26, simultaneously the finger 120 penetrates into the plate 80 thanks to the cam 132, the securing ring 100 then pivots in the clockwise direction, releasing the lugs 32 from the container flange 22, finally the snap-fitting devices 34 are deactivated in such a way as to release the locking connecting rods 40. The container can then be removed from the securing ring.

The connection device allows for a connection between a container and a cell, without rotation of the container, which simplifies the operations for the operator and allows for the manipulation of fragile objects contained in the container.

The connection device can offer greater facility for cleaning since it can comprise no element inside the cell. The entire mechanism is located outside of the cell.

The outside control offers greater handling for the operator.

The connection device furthermore makes it possible to improve the rates of closing/opening per day, allowing for a gain in productivity, with all of the steps of transfer carried out by the manipulation of the outside crank or activation of the motor.

It moreover has maintenance and repair that is facilitated due to its simple structure, all the more so when its actuating means are located outside of the cell. Moreover, the arrangement of the actuating means outside allow for a motorisation of the device in a very simple way. By arranging the actuating means outside of the cell, the latter is no longer in contact with the sterilising agent, which reduces the risks of damage and malfunction.

In addition, safety is improved, since in the case of actuating by the outside, it is no longer required to access the inside of the cell by means of gloves mounted in a sealed manner through a wall of the cell in order to actuate the mechanism, or for maintenance.

According to a variant, it can be considered that the securing ring 100 be set into rotation via the ring gear 48, the ring gear would then be the sole control member for all of the steps.

What is claimed is:

1. An assembly comprising a first closed space and a connection device for a sealed connection between the first closed space and a second closed space, with the first closed space comprising a first flange and a first door closing off in a sealed manner an opening delimited by the first flange, and the second closed space comprising a second flange and a second door closing off in a sealed manner a second opening delimited by the second flange, with the second door being secured to the second flange by a bayonet connection, said connection device being mounted on a wall of the first closed space and comprising:

a first securing device for securing the first and second flanges to one another, a second securing device for securing the second door and the first door in a sealed manner and for detaching the second door from the second flange, a releasing device for releasing the first door in relation to the first flange, an opening device for opening a passage between the first and the second closed space, a control ring comprising a single ring gear able to be placed in rotation around a longitudinal axis, with the rotation of said ring gear actuating at least the second securing device, the releasing device and the opening device, a first actuator for actuating said control ring, and a second actuator for actuating the first securing device.

2. The assembly according to claim 1, wherein the first actuator and the second actuator are arranged outside of the first closed space.

3. The assembly according to claim 1, wherein the control ring is arranged outside of the first space and surrounds the first flange.

4. The assembly according to claim 3, wherein the second securing device, the releasing device and the opening device are arranged at the periphery of the first flange around the control ring.

5. The assembly according to claim 1, wherein the first securing device comprises a securing ring mounted mobile in rotation in relation to the first flange around the longitudinal axis and comprises a bayonet connector in order to immobilize the second flange in relation to the first flange.

6. The assembly according to claim 1, wherein the second securing device comprises a securing plate mounted mobile in rotation on an outer surface of the first door around the longitudinal axis and able to be secured to an outer surface of the second door by a bayonet connection.

7. The assembly according to claim 6, wherein a first portion of displacement in rotation of the securing plate secures the first door and the second door and a second portion of displacement in rotation of the securing plate unlocks the second door in relation to the second flange.

8. The assembly according to claim 7, wherein the second securing device comprise at least one pinion meshing with an actuating sector gear carried by the control ring, a displacement in rotation of the control ring causing a rotation of the securing plate.

9. The assembly according to claim 8, wherein the second securing device comprises a gear train coupled to the securing plate in order to place it in rotation, said gear train being driven by said at least one pinion.

10. The assembly according to claim 9, wherein the at least one pinion comprises a straight-toothed pinion meshing with the actuating sector gear and an angle transmission.

11. The assembly according to claim 8, comprising a locking device for locking the first door and the second door to each other when they are separated from the first and second flanges.

12. The assembly according to claim 11, wherein said locking device comprises a finger mounted mobile in the securing plate, said finger being configured to be retracted in the securing plate when the second door is arranged against the first door and being configured to protrude from the securing plate when the securing plate secures the first and the second door, with the finger blocking with a stop the rotation of the second door in relation to the first door.

13. The assembly according to claim 12, wherein said finger comprises a roller and wherein said locking device comprises a cam carried by an outer surface of the first door providing the return into retracted position of the finger in the securing plate in a separation phase of the first and second closed spaces.

14. The assembly according to claim 1, wherein the releasing device comprises a locking cam and a locking roller, said locking roller being configured to take a first position wherein said locking roller cooperates with the locking cam preventing the opening of the first door and a second position wherein said locking roller is separated from the locking cam, with the passing from the first position to the second position and from the second position to the first position being caused by the rotation of the control ring.

15. The assembly according to claim 14, wherein an actuating roller cooperates with a radial cam surface of the control ring, causing pivoting of the locking roller.

16. The assembly according to claim 14, wherein the locking cam is secured with the first door and the locking roller is mounted mobile in rotation on the first flange around an axis parallel to the longitudinal axis.

17. The assembly according to claim 1, wherein the first door is articulated with respect to the first flange around a hinge with axis orthogonal to the longitudinal axis and wherein the opening device comprises at least one pinion meshing with an actuating sector gear of the control ring, said at least one pinion being coupled to said hinge, with the displacement in rotation of the control ring causing a rotation of the first door around the hinge.

18. The assembly according to claim 1, comprising a system for the axial maintaining of the second flange on the first flange, prior to the securing by the first securing device.

19. The assembly according to claim 18, wherein the system for the axial maintaining by snap-fitting comprises at least two devices for the axial maintaining by snap-fitting.

20. The assembly according to claim 19, wherein the at least one device or the at least two devices for the axial maintaining by snap-fitting comprises an actuating connecting rod, a locking connecting rod and a blocking device blocking said locking connecting rod in locked position and an actuator for actuate the blocking device in order to release the locking connecting rod.

21. The assembly according to claim 18, wherein the second flange comprises at least two radially protruding portions, with each of the two protruding portions cooperating with a device for axial maintaining by snap-fitting.

22. The assembly according to claim 21, wherein the system for the axial maintaining by snap-fitting comprises at least one device for the axial maintaining by snap-fitting and a device for the passive axial maintaining or at least two devices for the axial maintaining by snap-fitting.

23. The assembly according to claim 22, wherein the second flange comprises at least two radially protruding portions, one protruding portion cooperating with the device for the axial maintaining by snap-fitting and another protruding portion cooperating with the device for the passive axial maintaining.

24. The assembly according to claim 1, wherein the actuating of the second securing device, the releasing device and the opening device for the purposes of the sealed connection between the first and second closed spaces is obtained by a unidirectional rotation of the control ring.

25. The assembly according to claim 1, wherein the control ring comprises a driving gear sector cooperating with a pinion of the second actuator.

26. The assembly according to claim 1, wherein the first actuator also forms the second actuator.

27. The assembly according to claim 1, wherein at least one of the first and second actuators is motorized.

28. The assembly according to claim 1, wherein the control ring comprises teeth that extend only over a portion of the periphery of the control ring to provide a drive sector.

* * * * *